July 21, 1931. J. MULLER 1,815,875
APPARATUS FOR DELIVERING MEASURED QUANTITIES OF LIQUID
Filed July 20, 1927 4 Sheets-Sheet 1
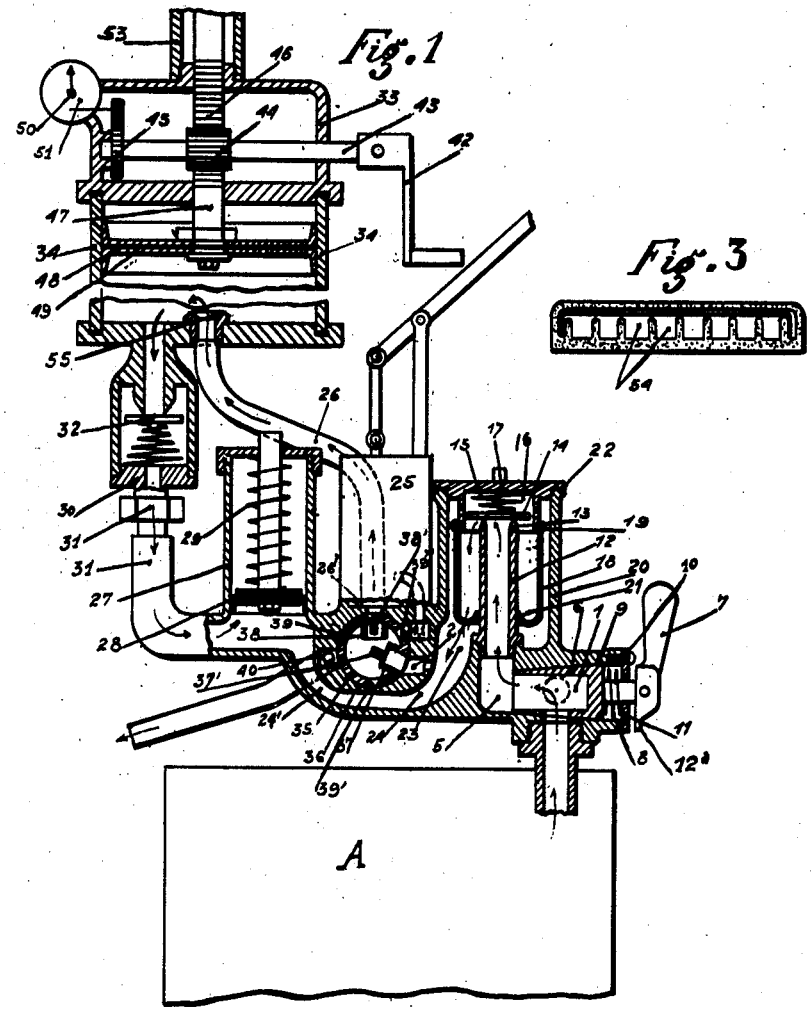
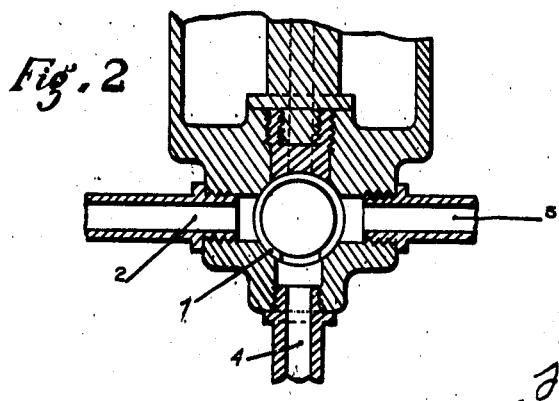

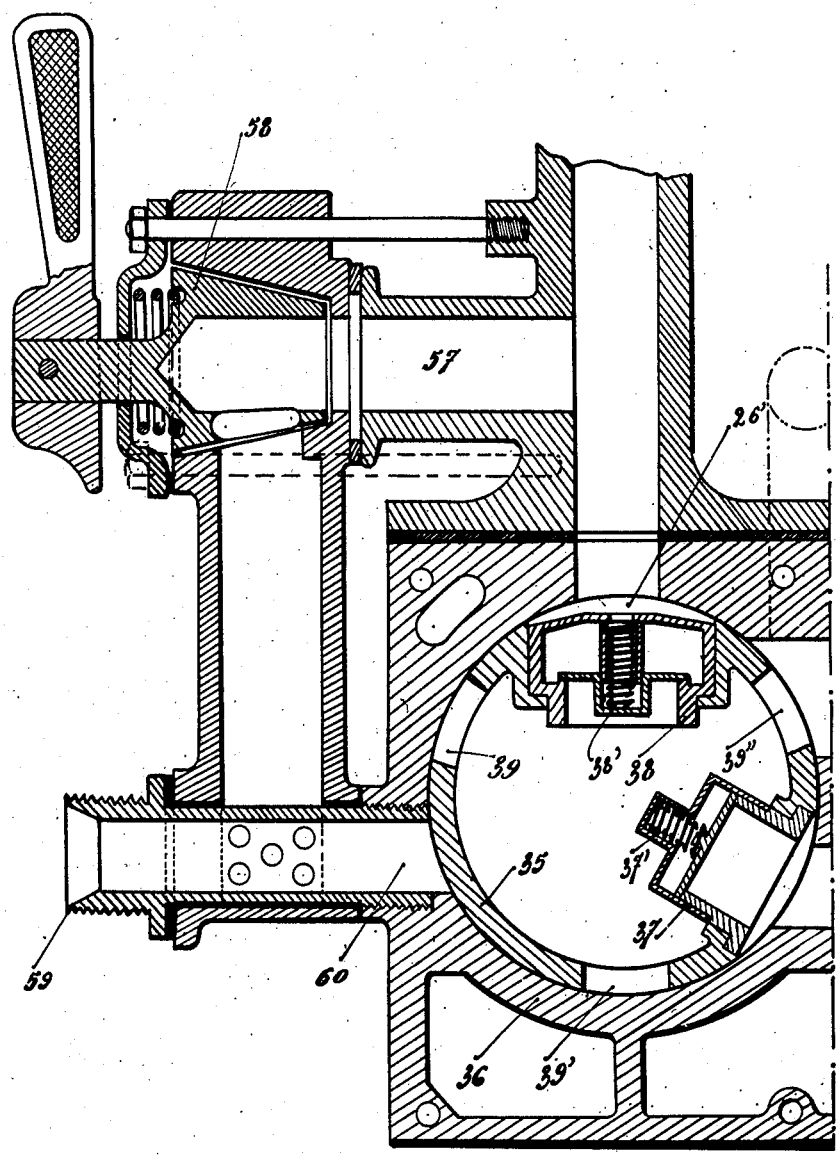

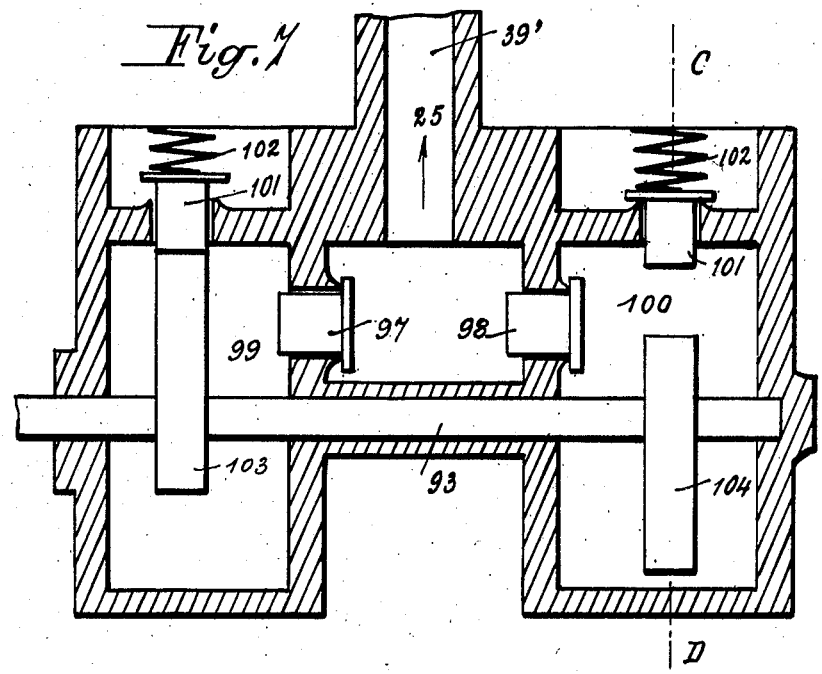
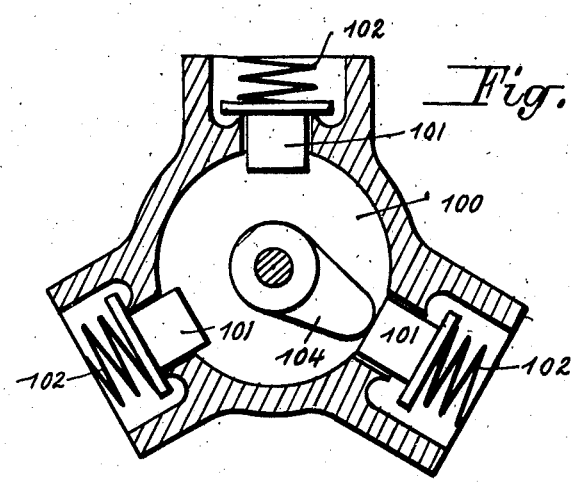

Patented July 21, 1931

1,815,875

UNITED STATES PATENT OFFICE

JACQUES MULLER, OF LA GARENNE COLOMBES, FRANCE

APPARATUS FOR DELIVERING MEASURED QUANTITIES OF LIQUID

Application filed July 20, 1927, Serial No. 207,277, and in France July 20, 1926.

Apparatus for delivering measured quantities of liquid are known in which a pump supplies the liquid from a reservoir to one or more measuring cylinders which may or may not be enclosed, and which are adapted to distribute the liquid to the exterior.

In such apparatus, whether it be adapted or not for the automatic emptying and refilling of successive or conjugate measuring cylinders, the expulsion of liquid from the cylinders takes place under gravity and consequently necessitates that the cylinders have a level superior to that of the vessel receiving the liquid therefrom. As regards the quantity of each unit delivery, it is either fixed, or limited to a small number of volumes provided for in advance, and the discharge takes place by one or more exterior orifices connected directly to the cylinders, so that it is impossible to draw off liquid without the liquid passing through these cylinders.

Finally when these cylinders are full the pump is either found to be immovable or its continued operation provokes liquid "hammering" which is often deleterious to the mechanism and to the passage system.

Distribution by gravity, as applied to liquid petroleum products and other fluids, becomes increasingly difficult as the viscosity augments, as a result of friction, of adherence, and of agitated level of the surface, exact measurement is rendered difficult, the visibility is suppressed and the very slow flow necessitates large orifices. One of the advantages of the apparatus to be hereinafter described is that it permits of visible distribution, in certain and exact quantities, of all liquids, even viscous ones; a single pump allowing at will successive delivery, of several liquids of different quantities in any desired order, which liquids may have been previously filtered, and which can be delivered directly (i. e. without measurement) if required.

Another advantage of the present apparatus is the substitution of gravity flow, by flow due to pressure exerted on the liquid after it has been led into the measuring cylinder, thus permitting the giving to the latter of any desired position, and of distributing liquid therefrom whatever may be the height of the organ destined to receive it, and the pressure necessary for its replenishment.

The apparatus according to the present invention comprises a pump which draws the liquid from a supply pipe, a rotatable member through which the liquid is delivered to a measuring cylinder by the pump, and an auxiliary cylinder, said auxiliary cylinder being adapted to receive excess of liquid delivered by the pump and to return the excess to the rotatable member after the said member has been turned to allow liquid to be discharged from the measuring cylinder and is reset to allow the measuring cylinder to be refilled by the pump.

The invention also has for its object apparatus for delivering liquids applicable particularly for lubricants, which enables distribution in determined and variable quantities and qualities of different purified liquids with possibility of control by the purchaser of the quantity and quality supplied.

For this purpose a multi-way cock is provided, each of the ways of which can be connected to a receptacle for liquids so as to individually supply liquids from these receptacles by way of a spring controlled valve of large surface, of which the seat has a sharp edge and a filter, before their passage into a suction pump.

From this latter the liquid is charged either into the observing and measuring cylinder from which it is delivered by a mechanism actuating a discharging piston and if desired a counting device, or to the exterior by closing the inlet for the liquid to the measuring cylinder by the piston of this latter forming a valve.

For the purpose of enabling with the same operation of the members the discharge of the liquid to be discharged into different circuits, suction and delivery valves with large delivery are mounted on a cylindrical or cylindro-conical rotary member forming between such valves an angle of 120°. This member is also provided with peripheral openings 120° apart, one of these openings being along the bisecting line of the angle of the valves, and turns in a stationary body provided with three passages at 120° and a fourth on the bisecting line of two of the preceding ones. This arrangement, according to the position of the respective valves enable suction of the liquid, which is obtained from the receptacle containing it or from the auxiliary cylinder, and its delivery into the measuring cylinder or directly to the outside, and it also enables the measuring cylinder to be discharged, either to the outside or back into the liquid receptacle.

It will be understood that other circuits may be arranged by providing on the rotary member, and the body openings different in number and position according to the purposes of use of the apparatus forming the subject of the invention.

In order to effect the movement of the piston of the suction pump to the bottom of the discharge stroke even when the measuring cylinder is full, there is provided on the measuring cylinder or in connection therewith a cylinder with an elastic piston receiving the excess of liquid which it maintains under pressure until the next distribution, returning it through the valve chamber of the pump.

Finally the apparatus may be provided at any desired point with any emptying device necessitated by the change of quality of liquid to be distributed.

The apparatus is capable of the use irrespective of the composition and state of the liquid, it being understood that the nature of the substances coming into consideration do not cause any disturbance in the operation or use; thus in the case of hot oil and any liquid which attacks leather, the latter is replaced by agglomerated cork or moulded rubber, and in order to ensure fluid tightness, the piston is covered with an elastic metallic coating.

Finally the apparatus may be provided with means for the direct refilling with oil, by heating means for the liquid in certain particular cases, by heating means for the members of the apparatus, etc.

By way of example there is illustrated in the accompanying drawings an apparatus for distributing oil, constructed in accordance with the invention.

Fig. 1 shows a general view diagrammatically in elevation and in section of the complete distributor.

Fig. 2 is a section of the multi-way cock.

Fig. 3 is a detail of a piston of agglomerated cork, and

Fig. 4 shows the arrangement adopted for the direct distribution of the liquid to the outside.

Fig. 7 shows the disposition of the three parallel chambers, and

Fig. 8 is a section on line C—D, Fig. 7.

Figure 5:
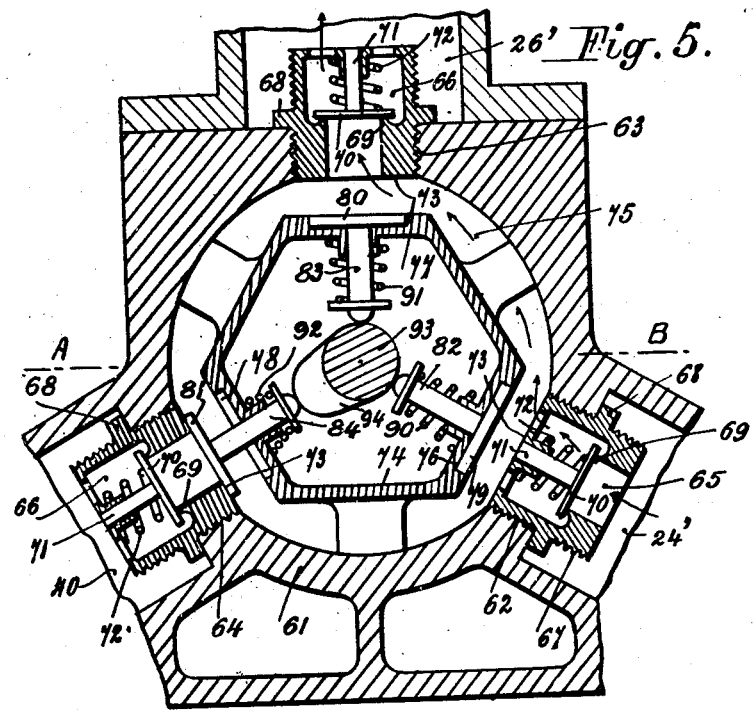
Fig. 5 shows the various clack valves and closing devices.

Referring to the drawings it will be seen that the cock 1 with a number of inlets 2, 3, 4 enables one of these to communicate with the discharge pipe 5.

Each of the inlets is connected either to a liquid tank A, or closed by a plug, or free for any eventual use.

The body 6 of the cock 1 is operated by an outer handle 7 and is held resiliently by the spring 8, see Fig. 1 in the body 9 by the screw closure 10 of the cap 11.

The point $12^a$ of the handle 7 moves in front of an indicator direction dial which may be the cap 11 itself. Into the pipe 5 is screwed a vertical tube 12 of which the top 13 has a sharp edge and forms the seat of a flat valve 14 of large delivery constantly pressed thereon by the spring 15 disposed in the chamber 16 of the cap 17 supporting the filter 18 by means of rivets 19. This valve 14 may at first be raised easily by unscrewing the cap 17 in the case of eventual filling of one of the tanks by the pump or in any other suitable manner. The cap 17 closes the cylindrical body 20 containing the filter and enables the latter to be removed easily for replacement or cleaning. 21 is a lower ring supporting the base of the filter which embraces the tube 12 and 22 is a fluid tight plastic washer. The filter 18 is of any suitable nature chamois, leather, fabric, network etc.

The body 20 communicates by means of its lower tubular member 23 with the suction passage of the suction and discharge pump 25 of any suitable type.

The discharge passage 26 of the pump 25 communicates directly with the measuring cylinder 33 and this by the passage 31 with an auxiliary or compensating cylinder 27 in which moves a piston 28 with an opposing spring 29. This compensating cylinder is adapted to receive the excess liquid contained in the cylinder of the pump 25 when the measuring cylinder is full for passing it then elastically into the said measuring cylinder for the succeeding distribution and before any pumping into the tank, by means of the branch 24″ on the suction passage 24.

The discharge of the excess of liquid into the auxiliary cylinder 27 takes place through the fluid-tight fitting 30 and the pipe 31 by passing through a flat valve 32 preventing any return to the cylinder 33 with the transparent wall 34 (reinforced or sufficiently thick glass for example.)

The valve chamber of the pump (Fig. 4) is provided with a cylindrical or cylindro-conical member 35 turning in a stationary body 36. The suction valve 37, flat and of large delivery, opens towards the interior of the chamber and that for discharge 38 also flat and of large delivery, opens towards the outside. Springs 37', 38' tend constantly to hold the valves on the seat with quick action. The valves form between them an angle of 120° and the member 35 is also provided with three other openings 39, 39', 39'' also at 120°, this latter being on the bisecting line of the angle of the valves 37 and 38, and in the position shown in Figs. 1 and 4, connecting the interior of the member 35 with a passage 41 leading to the pump 25, said passage serving for filling the pump through member 35.

The body 36 is provided with four passages, the suction passage 24' and the discharge passage 26' forming between them an angle of 120°, one 40 for the discharge of liquid to the outside and at 120° to the preceding ones and one 41 between and at an equal angular distance from the passages 24' and 26' and connected to the pump 25. In Fig. 1 the valves 37 and 38 are in the correct position for the subsequent filling of the measuring cylinder on operation of the pump.

After charging the measuring cylinder and on a rotation through 120° in an anti-clockwise direction, the position corresponds with the discharge of liquid from the measuring cylinder through the cylindro-conical member to the outside, whilst rotation through 60° in a clockwise direction corresponds with the discharge liquid from the measuring cylinder into the supply circuit. This distribution takes place mechanically from the outside by means of the handle 42 engaging with the square portion of a shaft 43 with pinions 44 and 45. The pinion 44 gears with a rack 46 forming the rod 47 of the piston of the measuring cylinder 33. This piston is formed of a double leather 48, 49 mounted in known manner.

The pinion 45 actuates the hand 50 of a counter 51 indicating the quantity of liquid delivered with or without combination with a totalizing counter for the delivery and not illustrated.

The rod 47 of the piston is extended at the upper end and passes into a graduated tube of glass 53 indicating the capacity of the cylinder 33 which is filled with liquid.

The leathers of the pistons may be replaced according to the purpose of use (hot oil or liquids which attack leather for example) either by agglomerated cork or moulded rubber. In this case the coating is of the same shape or of any other suitable shape, but the spacing and adherence are obtained by a metallic and elastic coating 54 such as indicated in Fig. 3.

For the direct distribution of liquid without passing through the measuring device there is employed the device illustrated in Fig. 4. For this purpose the piston 48, 49 is at the bottom of its stroke and closes the openings 55 of the passage 26. The liquid discharged by the pump then passes through the member 57 and the cock 58 to the discharge tube 59, the openings 60 being then closed by one of the surfaces of the member 35.

It will be understood that the apparatus above described may be provided with all accessories of a known and suitable type enabling, for example, the heating of the liquid distributed, the heating of the members of the distributor, the emptying of the passages, etc.

On the other hand the means employed for the operation of the members constituting the invention are not limited to those described which are given solely by way of example and which may be replaced by any other equivalent device.

When the apparatus according to the invention is to be used with liquids having a very fluid nature, such as gasoline or with hot liquids, it may happen that the rotatable cylindrical member provided with the suction and discharge valves will bind in its recess so that it will be no longer under proper control. (Reference is had to Figs. 5, 6, 7 and 8).

In one arrangement which I have devised to obviate this defect, I eliminate the rotatable cylindrical member, and I dispose upon the stationary body of the apparatus communicating with the fluid circulation conduits, two clack valves for each conduit i. e. a suction valve and a discharge valve. The said valves are placed in circular position about what would be the axis of the said cylindrical member which is now eliminated. In concentric position and adjacent the said valves are disposed radially movable closing devices which are pressed upon their seats in the open position of the said valves, said devices being caused to lie flush so as to offer no obstacle to the flow of the liquid, by suitable elastic means. The said closing devices are controlled from the exterior by a cam shaft on which the cams are so disposed as to close a plurality of the said valves at the same time. In this manner, by properly placing the cams, and according to the position of the cam shaft, I obtain all necessary combinations for the connection between any two conduits of the apparatus leading into the stationary body.

In order to render all the valves interchangeable and to utilize them both for suction and discharge, I employ automatic valves which preferably consist of a ring with external screw thread and middle collar or flange; in the interior of the ring is formed the seat of the closing portion of the valve.

In another device for the purpose I employ three parallel chambers, comprising an intermediate chamber which is connected with the pump by a single conduit, and is connected with the first chamber—forming a suction chamber—by a suction clack valve, and with the last chamber, which forms a discharge chamber, by a discharge valve.

The inlet end of the conduits of the apparatus open into the end chambers, and are normally closed at these points by automatic clack valves opening outwardly; said valves are raised in pairs by two tappets mounted upon a control shaft, one valve being utilized in the suction chamber and the other in the discharge chamber.

In Fig. 5 it is obvious that the rotatable member provided with the clack valves is eliminated, and that the apertures or conduits, 24', 26', 40, which open into the stationary main body 61 of the apparatus and pertain thereto are made double (Fig. 6) and are threaded at 62, 63, 64, thus receiving for each aperture a suction valve and a discharge valve, 65 and 66 respectively. The said valves may be used for suction or for discharge, and for this purpose, each valve consists of an externally threaded ring 67 provided with external central collar 68 in contact with the main body 61, and having in the interior the seal 69 of the closing disk 70 of the valve which is guided by the rod 71 and is pressed upon its seat by the spring 72 which abuts against the perforated end 73 of the valve. It will be noted that according to the direction in which the said valve is mounted, it may be operated for suction or discharge, as clearly shown in Fig. 5.

The member 74 is secured to the body 61 in the axial position, leaving between the said member and the body 61 an annular passage 75 for the liquid. The member 74 is provided adjacent the apertures 24', 26', 40 with the seats 76, 77, 78 of the closing elements 79, 80, 81 adapted for radial motions; said elements are guided by their rods 82, 83, 84 and are pressed upon their seats by the springs 90, 91, 92. The said closing elements, when in the inoperating position, are caused to lie flush on their seats (Fig. 5) so as to offer no obstacle to the flow of the liquid in the passage 75, and they may close the opening of the clack valve with which they are in line. For this purpose they are controlled from the exterior by a central shaft 93 provided with cams 94, 95 placed in suitable position.

Figure 6:
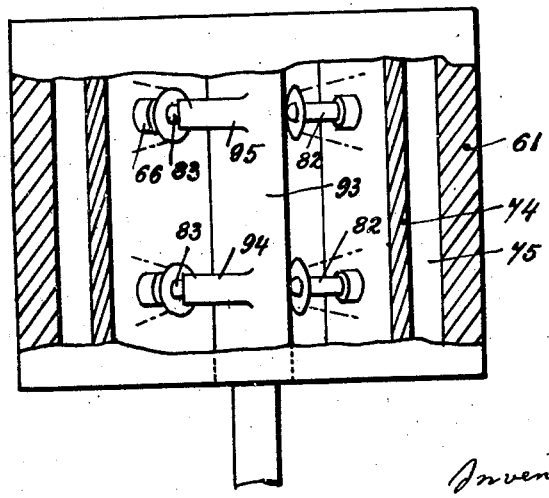
Fig. 6 is a plan view in section on line A—B, Fig. 5.

The conduit 39" in the drawings which leads to the pump opens into the annular passage 75, but is not shown in Figs. 5 and 6.

In the modification shown in Figs. 7 and 8, I employ three parallel chambers, whereof the middle chamber 96 is connected with the pump 25 by the conduit 39' and with the other two chambers by automatic clack valves comprising the suction valve 97 and the discharge valve 98. These valves are shown diagrammatically and are of known or convenient type. On the periphery of the outer suction chamber 99 and the outer discharge chamber 100 are disposed the clack valves 101 which open inwardly and are urged upon their seats by the strong springs 102.

In this modification each of the conduits 24', 26' and 40 communicates with both chambers 99 and 100 through one of the valves 101 in each chamber.

The shaft 93 carries two tappets 103, 104 adapted to lift two valves at a time, i. e. a valve communicating with the one conduit in the suction chamber and another valve communicating with a different conduit in the discharge chamber, thus enabling the pump to draw liquid from the first conduit and deliver it to the second conduit.

Obviously, I may utilize other constructions, and for instance in Fig. 5 the two clack valves of each conduit may have the concentric position, or like means may be employed.

What I claim is:

1. Apparatus for delivering measured quantities of liquid comprising a pump having suction and delivery valves and which draws the liquid from a supply pipe, a rotatable member through which the liquid is delivered to a measuring cylinder by the pump, and an auxiliary cylinder, said auxiliary cylinder being adapted to receive excess of liquid delivered by the pump and to return the excess to the rotatable member after the said member has been turned to allow liquid to be discharged from the measuring cylinder and is reset to allow the measuring cylinder to be refilled by the pump, said suction and delivery valves being provided on the rotatable member which is exterior of the pump.

2. An apparatus for delivering measured quantities of liquid comprising a pump, a measuring cylinder, a rotatable valve through which the liquid is delivered to the said cylinder by said pump, an auxiliary cylinder for receiving excess of liquid delivered by said pump, means for delivering said excess liquid to the rotatable valve, and means to permit the pump to refill said measuring cylinder.

3. An apparatus for delivering measured quantities of liquid comprising a pump, a measuring cylinder, a rotatable member through which the liquid is delivered to the said cylinder by said pump, an auxiliary cylinder for receiving excess of liquid delivered by said pump, means for delivering said excess liquid to the rotatable member, and resetting means to permit the pump to refill said measuring cylinder, the rotatable member being in the exterior of the pump. and suction and delivery valves on said rotatable member.

4. Apparatus according to claim 2 in which suction and delivery valves are provided in a rotatable member and in which said suction and delivery valves are disposed at an angle of 120° apart on a cylindrical or cylindro-conical rotatable member also provided with peripheral openings 120° apart of which one is on the line which bisects the angle between the said valves; and in which the said valve is capable of rotating in a stationary body provided with three passages at 120° apart and with a fourth passage on the line which bisects the angle between two adjacent passages.

In testimony whereof I hereunto affix my signature.

JACQUES MULLER.